US012732454B2

(12) United States Patent
Mishra et al.

(10) Patent No.: US 12,732,454 B2
(45) Date of Patent: Sep. 8, 2026

(54) REDUNDANT MULTICAST FOR DYNAMIC CONNECTIVITY

(71) Applicant: Cisco Technology, Inc., San Jose, CA (US)

(72) Inventors: Mankamana Prasad Mishra, San Jose, CA (US); Anil Kumar, Faridabad (IN); Sridhar Santhanam, Dublin, CA (US)

(73) Assignee: Cisco Technology, Inc., San Jose, CA (US)

(*) Notice: Subject to any disclaimer, the term of this patent is extended or adjusted under 35 U.S.C. 154(b) by 369 days.

(21) Appl. No.: 18/494,586

(22) Filed: Oct. 25, 2023

(65) Prior Publication Data

US 2025/0141788 A1 May 1, 2025

(51) Int. Cl.
*H04L 45/28* (2022.01)
*H04L 12/18* (2006.01)

(52) U.S. Cl.
CPC .......... *H04L 45/28* (2013.01); *H04L 12/1863* (2013.01)

(58) Field of Classification Search
None
See application file for complete search history.

(56) References Cited

U.S. PATENT DOCUMENTS 8,837,479 B1 9/2014 Kumar et al.
8,954,548 B2 * 2/2015 Glasser ............... H04L 61/4511 370/395.54
8,995,275 B1 * 3/2015 Iovine ..................... H04L 45/16 370/252
10,855,520 B1 12/2020 Kommula et al.
2004/0071164 A1 * 4/2004 Baum ................ H04L 61/4547 370/469
2013/0033978 A1 2/2013 Eckert et al.
2014/0359389 A1 * 12/2014 Seastrom .................. H04L 1/08 714/751
2015/0288733 A1 * 10/2015 Mao ...................... H04L 65/611 709/219
2016/0006573 A1 1/2016 Wu et al.
2021/0044445 A1 2/2021 Bottorff et al.
2021/0099426 A1 * 4/2021 Schloss ............... H04L 63/1483

* cited by examiner

*Primary Examiner* — Xavier S Wong
(74) *Attorney, Agent, or Firm* — Polsinelli P.C.

(57) ABSTRACT

In one aspect, a computer-implemented method for redundant multicast groups, includes receiving a request for an element of content from a device, where the element of content is associated with a first source address and a redundant source group identifying multiple servers in a network including the element of content, determining a second source address within the redundant source group has a shorter distance to a location of the device, and routing packets associated with the element of content from the second source address to the device. The method further includes determining the connection has failed, and routing, automatically upon determining the connection has failed, the device to a third source address of the multiple servers, where the third source address is selected according to a server selection policy.

20 Claims, 7 Drawing Sheets

RECEIVE A REQUEST FOR AN ELEMENT OF CONTENT FROM A DEVICE, WHEREIN THE ELEMENT OF CONTENT IS ASSOCIATED WITH A FIRST SOURCE ADDRESS AND A REDUNDANT SOURCE GROUP IDENTIFYING MULTIPLE SERVERS IN A NETWORK INCLUDING THE ELEMENT OF CONTENT 402

↓

DETERMINE A SECOND SOURCE ADDRESS WITHIN THE REDUNDANT SOURCE GROUP HAS A SHORTER DISTANCE TO A LOCATION OF THE DEVICE 404

↓

ROUTE PACKETS ASSOCIATED WITH THE ELEMENT OF CONTENT FROM THE SECOND SOURCE ADDRESS TO THE DEVICE 406

FIG. 4

REDUNDANT MULTICAST FOR DYNAMIC CONNECTIVITY

TECHNICAL FIELD

The present technology pertains to redundant multicast for dynamic connectivity in a network, and, more specifically, to identifying and connecting to relevant devices at a receiver upon a connectivity failure on a network to reduce client disconnects.

BACKGROUND

Multicast networking efficiently sends data from one sender to multiple receivers. Unlike unicast, where data is sent from one sender to one receiver, or broadcast, where data is sent from one sender to all connected devices, multicast is designed for one-to-many or many-to-many communication patterns where multiple recipients are interested in the same data. Multicast is commonly used for applications such as video conferencing, live video streaming, online gaming, and content distribution. It allows these applications to send data to multiple users simultaneously without duplicating the data for each recipient.

Multicast networks ensure steady streams of content delivery by providing a multicast group including a plurality of redundant sources that communicate with a network. Multicast, for example, is more efficient than unicast when transmitting data to multiple recipients. Instead of sending multiple copies of the same data to each recipient separately, multicast sends a single copy of the data that is shared among all interested recipients on the network. This reduces network congestion and conserves bandwidth.

While multicast offers many advantages, it also presents challenges in terms of configuration and management, especially in large and complex networks. Properly configuring routers and switches, managing multicast group memberships, and ensuring security can be complex tasks in multicast networks. One benefit to multicast networks is that when a source delivering content fails, there is another redundant source available to take its place. Redundant sources, however, can be at completely different geographic locations, increasing the distance between sources of content and the recipient. A way to dynamically connect to the nearest available server streaming the desired content is needed for efficient group communication in various networking applications.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example routine 400 for receiving data packets from a source of a redundant source group in accordance with some aspects of the present technology;

DETAILED DESCRIPTION

Figure 1:
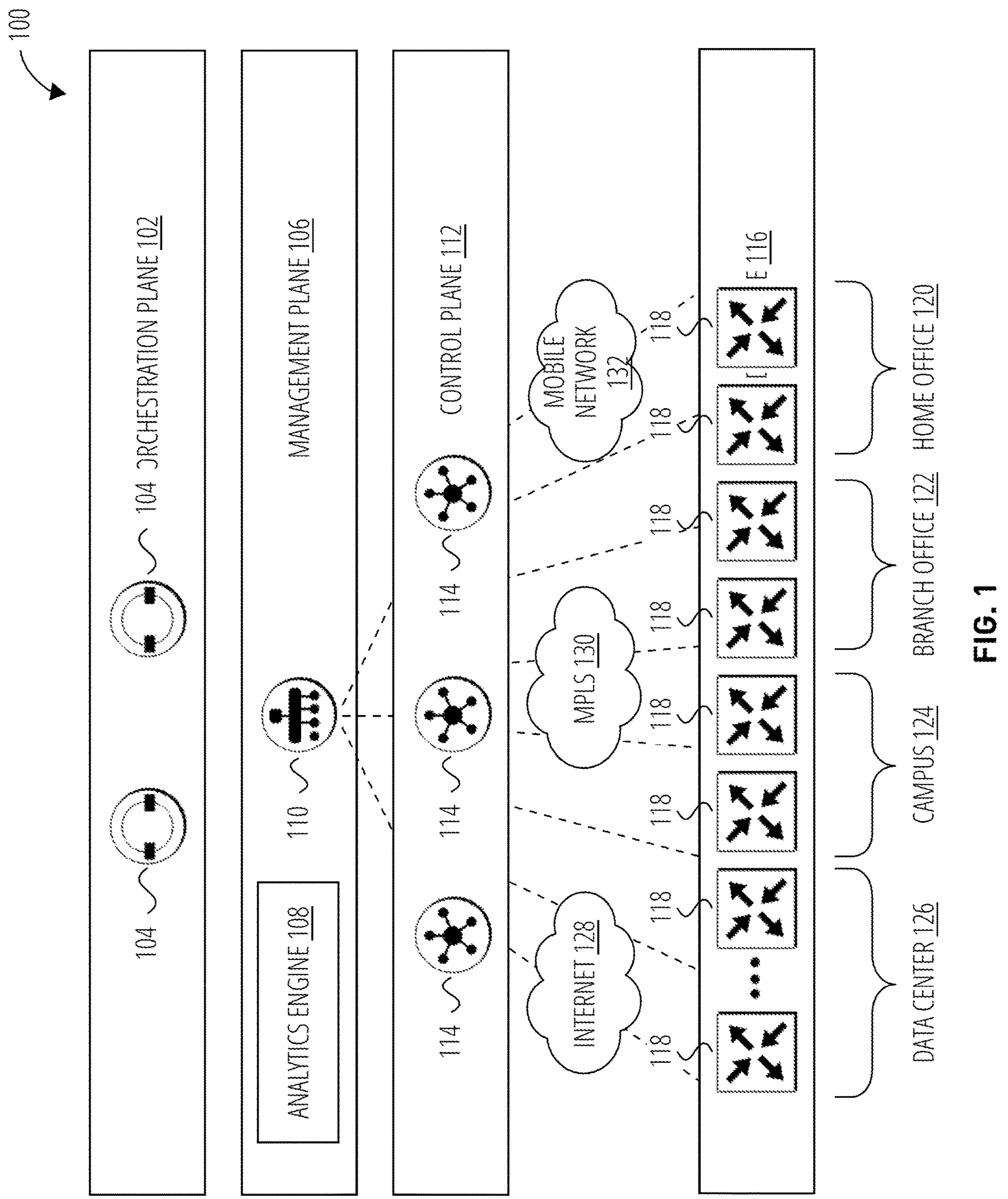
FIG. 1 illustrates an example of a high-level network architecture in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Aspects of the present disclosure can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Overview

In one aspect, a computer-implemented method for redundant multicast groups, includes receiving a request for an element of content from a device, where the element of content is associated with a first source address and a redundant source group identifying multiple servers in a network including the element of content, determining a second source address within the redundant source group has a shorter distance to a location of the device, and routing packets associated with the element of content from the second source address to the device.

In another aspect, the redundant source group is a group identification (ID) that has been configured based on one or more policies at a controller associated with the network.

In another aspect, the first source address and the second source address are a same server of the multiple servers in the network.

In another aspect, the first source address and the second source address are different servers of the multiple servers in the network.

In another aspect, the method further includes listing, on a forwarding routing table, one or more routes associated with one or more source addresses, where each of the one or more routes include at least a source ID associated with a source address, a group ID associated with the redundant source group, and a distance associated with the source address.

In another aspect, the method further includes monitoring a connection between the device to the second source address.

In another aspect, each of the multiple servers are associated with an individual Internet Protocol (IP) source address.

In another aspect, the element of content is the same across the multiple servers and includes one or more of a sports game, live event, television program, or broadcast. Other technical features may be readily apparent to one skilled in the art from the following figures, descriptions, and claims.

In another aspect, the method further includes determining the connection has failed, and routing, automatically upon determining the connection has failed, the device to a third source address of the multiple servers, where the third source address is selected according to a server selection policy.

In one aspect, a computing apparatus includes a processor and a memory storing instructions that, when executed by the processor, configure the apparatus to receive a request for an element of content from a device, where the element of content is associated with a first source address and a redundant source group identifying multiple servers in a network including the element of content, determine a second source address within the redundant source group has a shorter distance to a location of the device, and route packets associated with the element of content from the second source address to the device.

In one aspect, one or more non-transitory computer-readable media include computer-readable instructions, which when executed by one or more processors at a controller of a local site within the multi-cloud cellular service, causes the controller to receive a request for an element of content from a device, where the element of content is associated with a first source address and a redundant source group identifying multiple servers in a network including the element of content, determine a second source address within the redundant source group has a shorter distance to a location of the device, and route packets associated with the element of content from the second source address to the device. Other technical features may be readily apparent to one skilled in the art from the following figures, descriptions, and claims.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for a method allowing a receiver to dynamically connect to the nearest available server streaming the desired content. Typically, servers have a unique {source, group} address that are independent from one another, which doesn't allow for a receiver to dynamically connect to a different server if there is a failure of the current server. Set top boxes are not smart enough to store all source information, resulting in a configuration that makes it difficult to determine what servers are streaming the same content, but at different source addresses. A receiver is configured to connect to the nearest server, however is unable to identify a second nearest server outputting the same content.

Multicast redundant source groups solve the problem mentioned above. The last hop router of the receiver may mark, either provisioned by policy and/or by an associated controller, some groups as redundant source groups. For groups which have been marked as a redundant source group, processing would be different than regular processing. For example, if a receiver requests {S1, G1}, but S1 is unavailable, the router may redirect the request to {S2, G1}, assuming G1 is a redundant source group and S2 is the second closest source. Group ID will be used for determining which sources have copies of the content being requested. The source ID may or may not be where the actually used source is located.

In a redundant source group, one or more servers may be physically present in different geographical areas. Each of the servers have their own source IP addresses. For networking protocol purposes, each server presents unique flows but are internally the same content (e.g., the same sporting event, television show, live broadcast, etc.). Each router associated with the network will have an internal policy definition which defines certain groups as redundant source groups. For example, source A, source B, and source C may be a part of group A. A routing information base (RIB) table, a forward information base (FIB) table, etc. list one or more routes to particular network destinations. A RIB and/or a FIB table may be located within the router (e.g., the last hop router) and referenced when the router receives a request from a receiver. The routing table can include information on source ID, group ID, and distance to the destination. The routing table may also include a "cost" for each source, which is a value based on the geographical distance of the destination address/device from the router. For example, source A may have a cost of 100, source B may have a cost of 80, and source C may have a cost of 80. The actual "cost" value is arbitrary, but indicates, in some manner, a distance and/or processing power required to receive data from that source.

The router may select a source for the receiver. For example, the receiver may begin receiving input from source C. If source C becomes unavailable, the router, according to the internal policy, would pick a second source immediately and build a multicast tree from the new source with the same content. For example, the router may select source B and may begin immediately routing the content from source B to the receiver.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110. In some embodiments, the network management appliances 110 can provide centralized management of the network via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively or in addition, the network management appliances 110 can be a dedicated network management system for a single entity. In some embodiments, physical or virtual Cisco® SD-WAN vManage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 118.

A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. Border Gateway Protocol (BGP) is an Exterior Gateway Protocol (EGP) that is used to exchange routing information among network elements (e.g., routers) in the same or different ASes. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an AS are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 2:
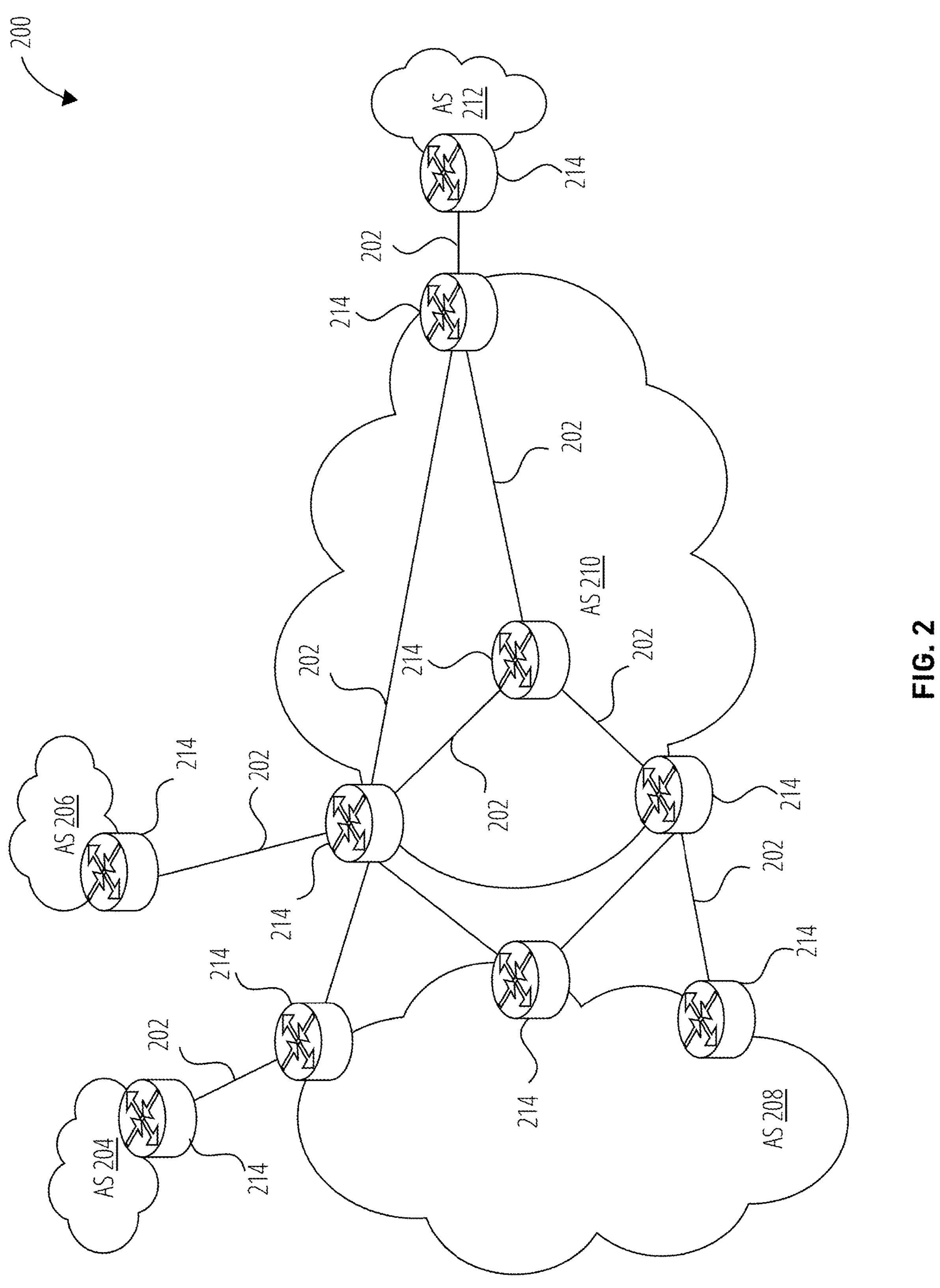
FIG. 2 illustrates an example communication network including one or more autonomous systems (ASes) in accordance with some aspects of the present technology.

FIG. 2 is a schematic block diagram of an example computer network 200 illustratively comprising network devices 214 interconnected by various methods of communication. For instance, the links 202 may be any suitable combination of wired links and shared media (e.g., wireless links, Internet Exchange Points, etc.) where certain network devices 214, such as, e.g., routers, computers, etc., may be in communication with other network devices 214, e.g., based on distance, signal strength, current operational status, location, etc. Those skilled in the art will understand that any number of network devices 214, links, etc. may be used in the computer network, and that the view shown herein is for simplicity.

Data packets (e.g., traffic and/or messages sent between the network devices 214) may be exchanged among the network devices 214 of the computer network 200 using predefined network communication protocols such as certain known wired protocols, as well as wireless protocols or other shared-media protocols where appropriate.

The computer network 200 includes a set of autonomous systems (AS) 204, 206, 208, 210 and 212. The computer network 200 may be positioned in any suitable network environment or communications architecture that operates to manage or otherwise direct information using any appropriate routing protocol or data management standard. For example, computer network 200 may be provided in conjunction with a border gateway protocol (BGP).

As noted above, an AS may be a collection of connected Internet Protocol (IP) routing network devices 214 under the control of one or more network operators that presents a common, clearly defined routing policy to a network (e.g., the Internet). Usually, an AS comprises network devices 114 that are established on the edge of the system, and that serve as the system's ingress and egress points for network traffic. Moreover, the network devices 214 may be considered edge network devices, border routers, or core network devices within the respective AS. These network devices typically, but not always, are routers or any other element of network infrastructure suitable for switching or forwarding data packets according to a routing protocol or switching protocol. For the purposes of the present disclosure, the network devices 214 located within an AS may alternatively be referred to as "forwarding network devices" or "intermediate network devices." Moreover, for illustration purposes, the ASes 204, 206, 208, 210, and 212 are shown with a limited number of network devices 214. In an actual implementation, however, an AS normally comprises numerous routers, switches, and other elements.

Each AS 204, 206, 208, 210, and 212 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the network devices 214 within the ASes, the network devices may exchange routing information to various network destinations. As described above, BGP is conventionally used to exchange routing and reachability information among network devices 214 within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (network devices 214), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., links 202, may be referred to as an "AS_PATH." The AS_PATH attribute indicates the list of ASes that must be traversed to reach the address destination. For example, as illustrated in FIG. 2, the AS 212 may store an AS_PATH attribute of "204 206 210 212" where the address destination is the AS 212 (or a particular IP address within AS 212). Here, the AS_PATH attribute indicates that the path to the address destination AS 212 from AS 208 passes through ASes 204, 206 and 210, in that order.

Although it may be preferable that all network devices 214 in the respective ASes 204, 206, 208, 210, and 212 be configured according to BGP, in a real-world implementation, it may be unlikely that each network device communicates using BGP. Thus, the disclosed embodiments are applicable to scenarios where all network devices 214 in the computer network 200 are configured according to BGP, as well as scenarios where only a subset of the network devices 214 is configured as such. Moreover, between any of the ASes, there may be a single communication path 202, e.g., between AS 204 and AS 208, as shown in FIG. 2, or there may be multiple communication paths 202, e.g., between AS 208 and AS 210. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS Path attribute of BGP update messages so that a BGP speaker can assess the validity of the AS Path in update messages that it receives. It should be understood, however, that the embodiments for implementing AS Path security disclosed herein are not limited to BGPSEC; certain embodiments may, additionally or alternatively, be applicable to other suitable protocols, including, for example, SoBGP, S-BGP, and PGPBGP, to name just a few.

Figure 3A:
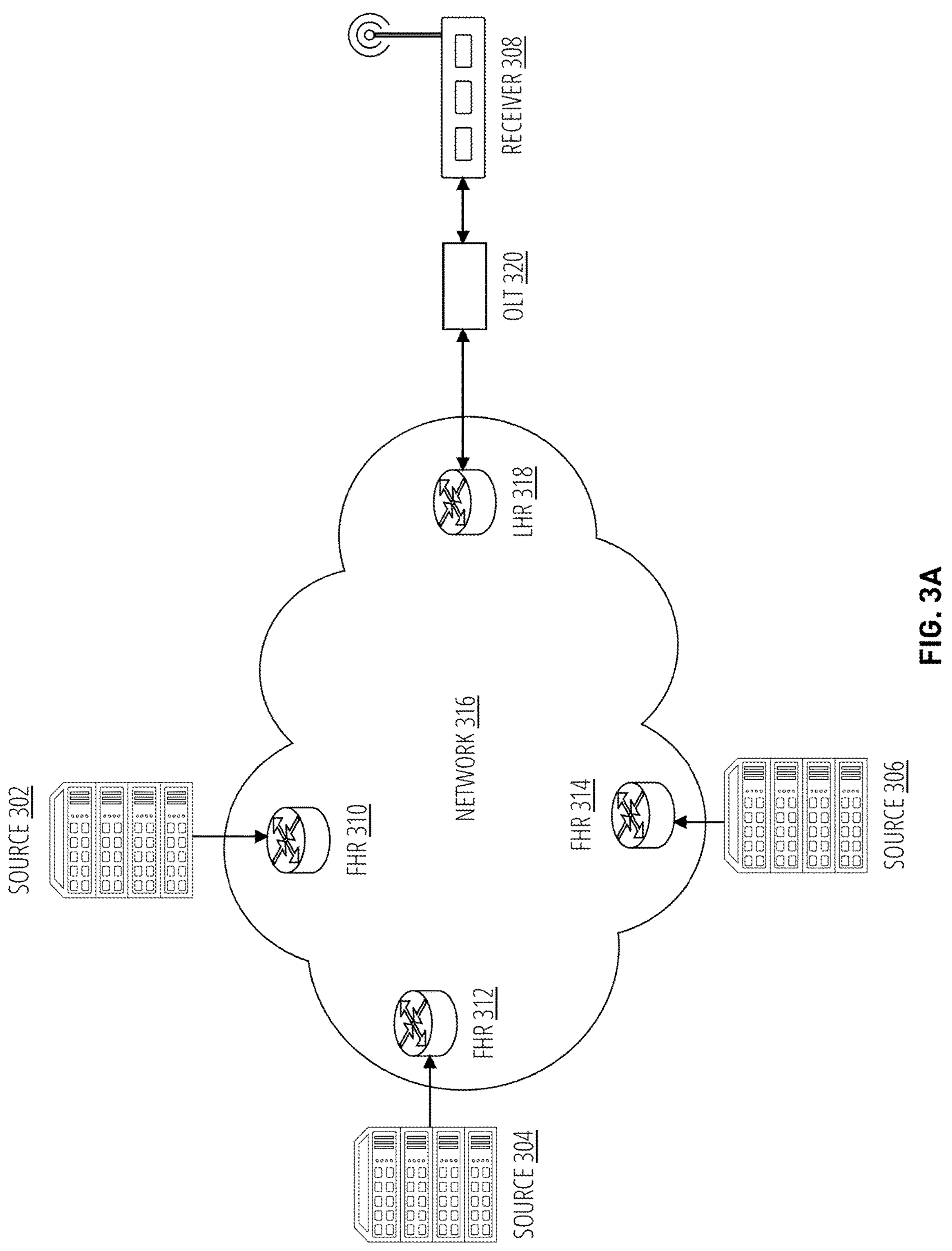
FIG. 3A illustrates a redundant source group of a multicast network in accordance with some aspects of the present technology.

FIG. 3A illustrates a redundant source group of a multicast network in accordance with some aspects of the present technology. The multicast network 316 may be associated with one or more sources that are members of the same multicast distribution tree (MDT). The network 316 allows a source to distribute content in the form of data packets to one or more receivers connected to the network that are also members of the associated MDT. By implementing redundant sources using the network 316, a receiver has one or more options for receiving a specific element of content. Redundant sources can be useful in distributing content when a user's satisfaction with the content is dependent on the content being in real-time or "live." For example, live sporting events, live award shows, live speech broadcasts, live gameshows, and/or any other element of content where the client benefits from receiving the element of content in real-time. For example, if, during the distribution of a live sporting event from a source, the connection is lost, the level of satisfaction of watching a re-run of the live sporting event greatly decreases.

By implementing redundant source groups, in an instance where one redundant source loses connectivity with the receiver, a second redundant source may be quickly connected to the receiver to mitigate the detrimental impact of losing the ability to watch live content. In this example, source 302, source 304, and source 306 may be redundant sources of a redundant source group associated with the multicast network 316. The redundant sources of the redundant source group may be associated with a respective border gateway protocol (BGP) first-hop router (FHR) configured to forward traffic from the respective source. Source 302 may be associated with FHR 310, source 304 may be associated with FHR 312, and source 306 may be associated with FHR 314. The respective FHRs may the first router in a series of "hops" throughout the network for traffic to reach a destination.

Receiver 308 may be a device configured to receive traffic and output content from one or more sources associated with network 316. For example, receiver 308 may be a set-top box configured to receive digital transmissions of audio and/or visual programming and display the digital transmissions to a user. Receiver 308 may be associated with a respective BGP last-hop router (LHR) configured to receive traffic from one or more sources associated with network 316 and forward the traffic to optical line terminal (OLT) 320. An OLT contains a central processing unit, passive optical network cards, a gateway router, and a voice gateway uplink card and processes and transmits data packets before forwarding them to a receiver. In this instance, OLT 320 receives data packets from LHR 318 and forwards the data packets to receiver 308. For example, LHR 318 may receive data packets from source 302 via FHR 310 and forward the data packets to OLT 320 for forwarding to receiver 308.

Each redundant source of the redundant source group may be associated with a particular address in the format: {source, group}. Source 302, source 304, and source 306 may be associated with different group addresses, but may be associated with the same group address to indicate membership in the redundant source group. For example, the redundant source group may be associated with address 232.1.1.1, source 302 may be associated with address 10.1.1.1, source 304 may be associated with address 20.1.1.1, and source 306 may be associated with address 30.1.1.1. In this manner, for example, source 302 may be identified using {10.1.1.1, 232.1.1.1}.

The redundant source group may be configured as a redundant source group at a last hop router and/or at a controller associated with the multicast network. The configuration as a redundant source group may be implemented by user-configured or controller driven policy at the controller and/or the last hop router. For example, a controller associated with network 316 may implement a policy identifying source 302, source 304, and source 306 as a redundant source group. In some other examples, LHR 318 may implement a policy identifying source 302, source 304, and source 306 as a redundant source group. The one or more redundant sources of the redundant source group may be identified as having the same "flow" (e.g., delivering the same content). In some examples, a multicast network may be comprised of more than one redundant source group. In such examples, each individual redundant source group may be associated with a respective group address and/or a flow identification to enable identification of which sources belong to which redundant source group.

Data pertaining to the redundant source group may be listed in a routing information base (RIB), forwarding information base (FIB), etc. A RIB may list one or more routes to one or more destinations and may be accessible by a router. For example, LHR 318 may access a RIB table that indicates that source 302, source 304, and source 306 are members of the redundant source group and are associated with the same flow. The RIB table may be located within LHR 318 and referenced when LHR 318 receives a request from receiver 308. The RIB table may contain data related to a source address, a group address, and a "cost" associated with each source of the redundant source group. The cost may be a value based on the geographical distance of the destination address/receiver from the source. For example, source 302 may have a cost of 80, source 304 may have a cost of 120, and source 306 may have a cost of 60. The value associated with the "cost" may be calculated using one or more algorithms defined by the network 316, but indicates a distance and/or processing power required to receive data from a particular source.

Figure 3B:
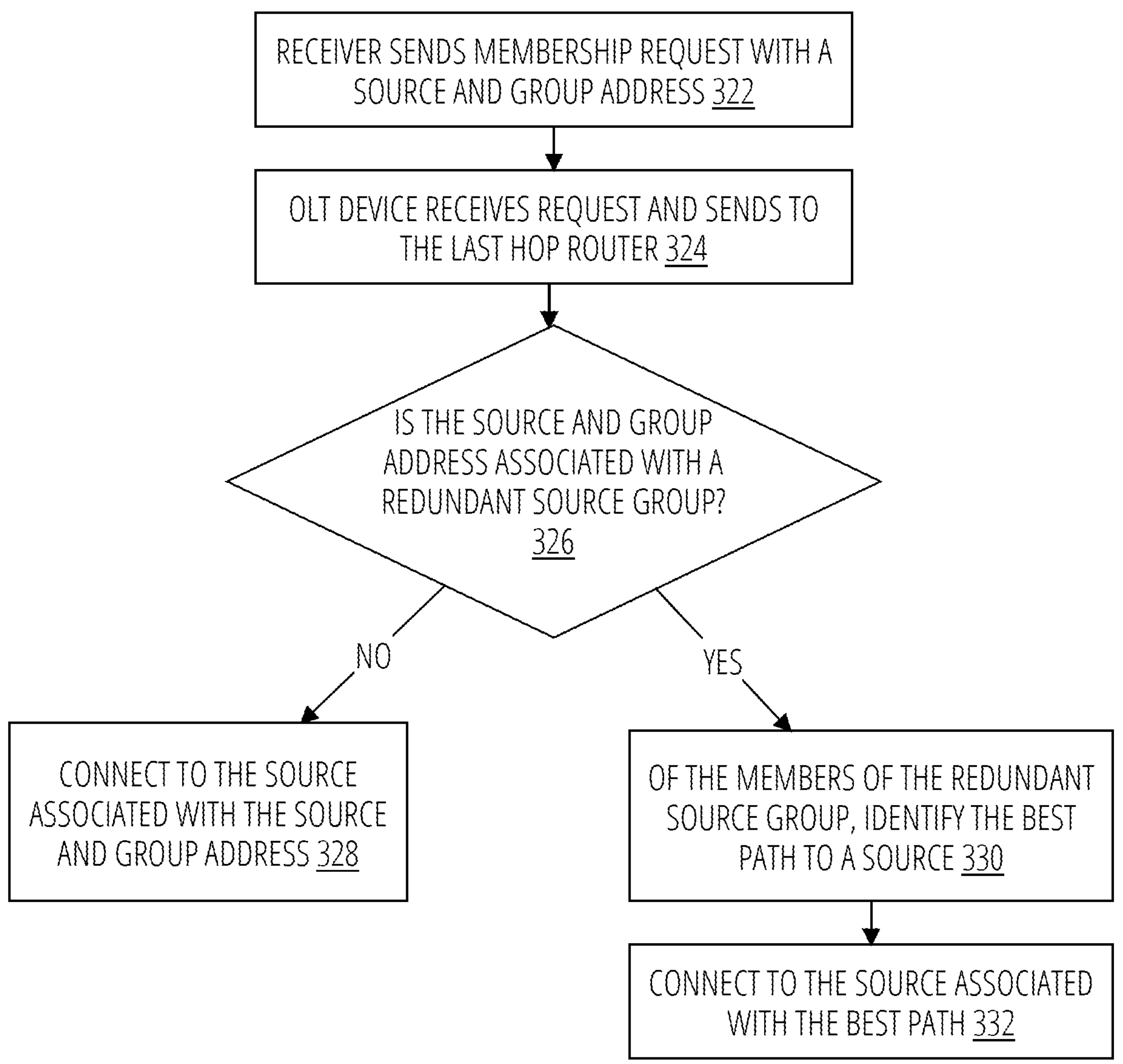
FIG. 3B illustrates an example routine for a destination device connecting to a redundant source of a redundant source group in accordance with some aspects of the present technology.

FIG. 3B illustrates an example routine for a destination device connecting to a redundant source of a redundant source group in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. FIG. 3B may describe one or more interactions between the components discussed in FIG. 3A, including, but not limited to, receiver 308, source 302, and LHR 318.

According to some examples, the method includes a receiver sending a membership request with a source and group address at block 322. For example, receiver 308 described in FIG. 3A may transmit a membership request (i.e., a request to connect to a particular source of a multicast distribution tree) with an address of {10.1.1.1, 232.1.1.1}, indicating a request to receive content from source 302 as described in FIG. 3A. The content may be associated with a particular flow (e.g., a sporting event, a live television show, etc.) input by a user associated with receiver 308. Receiver 308 may transmit the membership request to OLT 320 as described in FIG. 3A.

According to some examples, the method includes a OLT device receiving the membership request and sends to the last hop router at block 324. For example, OLT 320 may receive the membership request and forward the membership request to LHR 318 as described in FIG. 3A. OLT 320 may perform a conversion on the membership request to replicate the membership request in a format acceptable by LHR 318 and/or any other device associated with network 316 as described in FIG. 3A.

According to some examples, the method includes determining if the source and group address are associated with a redundant source group at decision block 326. For example, LHR 318 may receive the membership request that includes the source and group address {10.1.1.1. 232.1.1.1}. By referencing a RIB table that contains data pertaining to one or more redundant source groups, LHR 318 may determine that group address 232.1.1.1 references a redundant source group associated with a specific flow and/or content. The RIB table may include a source identifier, a group identifier, flow, content, or any other elements of data that are associated with a particular source (in this case, source 302). In some examples, the RIB table may be configured according to a policy implemented by LHR 318 and/or a controller associated with network 316. The policy may identify particular flows, sources, group addresses/identifiers, content, any combination thereof, or the like, that may belong to a redundant source group.

According to some examples, if the source and group address are not associated with a redundant source group, the method includes connecting to the source associated with the source and group address at block 328. For example, if the membership request included a source and group address {40.1.1.1, 432.1.1.1}, LHR 318 may conclude that group 432.1.1.1 and a source associated with 40.1.1.1 is not associated with a redundant source group. In that example, a protocol independent multicast (PIM) forwarding entry initiated by LHR 318 may direct the membership request to the appropriate source indicated by {40.1.1.1, 432.1.1.1}.

According to some examples, if the source and group address are associated with a redundant source group, the method includes of the members of the redundant source group, identify the best path to a source at block 330. For example, LHR 318 may conclude that the membership request comprising {10.1.1.1, 232.1.1.1} is associated with redundant source group comprised of source 302, source 304, and source 306, as described in FIG. 3A. The RIB table referenced by LHR 318 to determine the redundant source group may include data and/or an indication that {10.1.1.1, 232.1.1.1} is associated with a source and a respective redundant source group. The RIB table may also include a "cost" associated with each source of a redundant source group. The value associated with the "cost" may be calculated using one or more algorithms defined by the network 316, but indicates a distance and/or processing power required to receive data from a particular source. Upon identifying that the membership request indicates a redundant source group, LHR 318 may intentionally disregard the source address (e.g., 10.1.1.1) indicated in the membership request. LHR 318 may, instead, identify the best route to deliver the content and/or flow indicated by the membership request. For example, LHR 318 may attempt to identify a server closer to receiver 308 that is transmitting the same sporting event. The best route may be determined by the cost associated with a particular source. As mentioned above in FIG. 3A, sources, costs, and source addresses are as shown in Table I below:

TABLE I

Sources and Associated Source Addresses and Costs

| Source | Source Address | Cost |
|---|---|---|
| Source 302 | 10.1.1.1 | 80 |
| Source 304 | 20.1.1.1 | 120 |
| Source 306 | 30.1.1.1 | 60 |

To minimize cost, LHR 318 may not select source 302, the source associated with the source address indicated by the membership request. LHR 318 may select source 306, which is associated with the lowest cost. LHR 318 may initiate a PIM forwarding entry according to the selected best route, source 306. The PIM forwarding entry may comprise the service and group address of {30.1.1.1, 232.1.1.1}, indicating a request to receive transmissions from source 306 to receiver 308.

According to some examples, the method includes connecting to the source associated with the best path at block 332. For example, LHR 318, via a PIM forwarding entry, may request transmission from source 306 and receiver 308 may receive data packets from source 306. In some examples, upon receipt of data packets from source 306, a PIM entry corresponding to the incoming data packets may be modified to include the original membership request (e.g., {10.1.1.1, 232.1.1.1}) at LHR 318 before forwarding the modified data packets to OLT 320 and subsequently, to receiver 308. This may be done with encapsulation, extension headers, tunneling, etc.

In some examples, the connection between receiver 308 and source 306 may fail for one or more reasons, including hardware malfunction, software failure, BGP router failure, any combination thereof, or the like. In that example, LHR 318 may determine the second-best route associated with the redundant source group and the respective content/flow. For example, after failure of source 306, LHR 318 may determine that source 302 has the lowest cost of the remaining active sources of the redundant source group. LHR 318 may connect receiver 308 to source 302 to minimize content loss of a user associated with receiver 308.

FIG. 4 illustrates an example routine 400 for receiving data packets from a source of a redundant source group in accordance with some aspects of the present technology. Although the example routine 400 depicts a particular sequence of operations, the sequence may be altered without departing from the scope of the present disclosure. For example, some of the operations depicted may be performed in parallel or in a different sequence that does not materially affect the function of the routine 400. In other examples, different components of an example device or system that implements the routine 400 may perform functions at substantially the same time or in a specific sequence.

According to some examples, the method includes receiving a request for an element of content from a device, wherein the element of content is associated with a first source address and a redundant source group identifying multiple servers in a network including the element of content at block 402. For example, a last-hop router (e.g., LHR 318 as described in FIG. 3A) may receive a request for an element of content from a receiver (e.g., receiver 308 as described in FIG. 3A) that contains a source address and a group address of {10.1.1.1, 232.1.1.1}, identifying the redundant source group and a first source address. The first source address may be associated with a first source that is one of the multiple servers of the redundant source group. In some examples, the redundant source group is a group identification (ID) and/or address that has been configured based on one or more policies at a controller associated with the network. The policies may also be configured at a router, such as the last-hop router. The element of content (e.g., the "flow") associated with the request may be the same across the multiple servers and/or a redundant source group and includes one or more of a sports game, live event, television program, or broadcast.

In some examples, the last-hop router receives the request and references a routing information base (RIB) and/or a forwarding information base (FIB). The RIB/FIB may list one or more routes associated with one or more source addresses, wherein each of the one or more routes include at least a source ID associated with a source address, a group ID associated with the redundant source group, and a distance (e.g., the "cost") associated with the source address. The value associated with the cost may be calculated using one or more algorithms defined by the network, but indicates a distance and/or processing power required to receive data from a particular source. The one or more source addresses listed in the RIB/FIB may be associated with at least one of the multiple servers. In some examples, the source ID and/or source address associated with each of the multiple servers may be an individual Internet Protocol (IP) source address.

According to some examples, the method includes determining a second source address within the redundant source group has a shorter distance to a location of the device at block 404. For example, the last-hop router (e.g., LHR 318 as described in FIG. 3A) may determine that a second source associated with a second source address has a shorter distance to the receiver (e.g., receiver 308 as described in FIG. 3A) than the first source associated with the first source address contained in the request. The second source associated with the second source address may also be associated with one of the multiple servers of the redundant source group. The last-hop router may reference the RIB/FIB table that contains a "cost" or distance associated with each of the source addresses that are associated with the multiple servers. Using this data, the last-hop router may determine that the second source is a better choice than the first source, based on the cost associated with each the second source and the first source (e.g., the cost associated with the second source is quantifiably less than the cost associated with the first source). In some examples, the first source address and the second source address are a same server of the multiple servers in the network. In some other examples, the first source address and the second source address are different servers of the multiple servers in the network.

According to some examples, the method includes routing packets associated with the element of content from the second source address to the device at block 406. For example, a first-hop router (e.g., FHR 310, FHR 312, or FHR 314 as described in FIG. 3A) associated with the second source may operate in conjunction with the last-hop router (e.g., LHR 318 as described in FIG. 3A) associated with the receiver (e.g., receiver 308 as described in FIG. 3A) to develop a connection and transmit data packets containing the element of content to the receiver. The connection between the receiver and the second source may be facilitated by a PIM forwarding entry.

In some examples, the last-hop router may monitor the connection between the receiver to the second source address. In some examples, the connection may fail and the receiver may no longer receive data packets associated with the element of content. The last-hop router may identify and/or receive notice of the failure and reference the RIB/FIB table to identify active routes associated with the group ID of the redundant source group and determine a third source address associated with a third source. The third source may be associated with one of the multiple servers of the redundant source group. The third source may also be selected according to the server selection policy.

Figure 5:
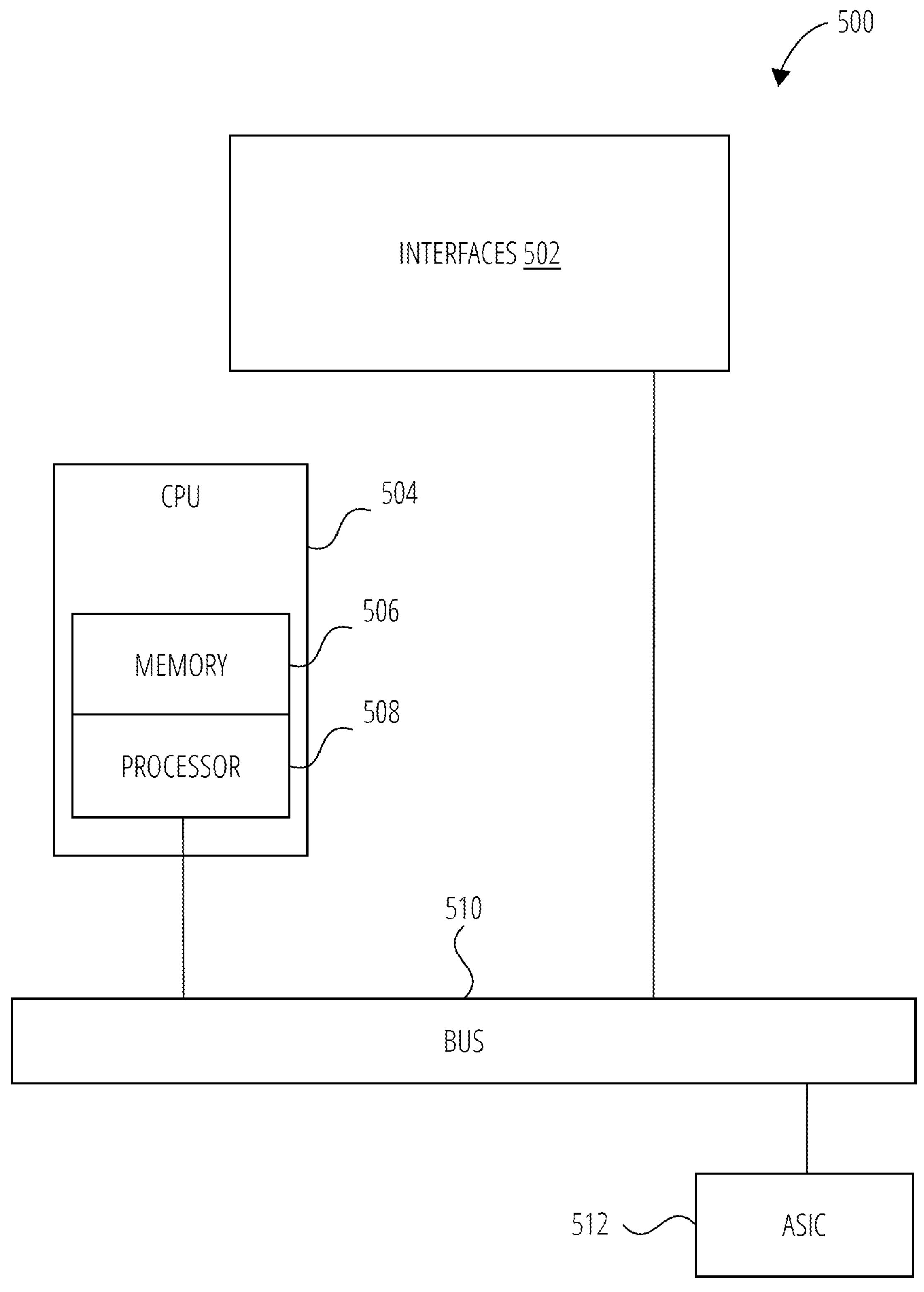
FIG. 5 illustrates an example network device in accordance with some aspects of the present technology.

FIG. 5 illustrates an example network device 500 suitable for performing switching, routing, load balancing, and other networking operations. The example network device 500 can be implemented as switches, routers, nodes, metadata servers, load balancers, client devices, and so forth.

Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LORA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 504) to efficiently perform routing computations, network diagnostics, security functions, etc.

Although the system shown in FIG. 5 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC) 512, which can be configured to perform routing and/or switching operations. The ASIC 512 can communicate with other components in the network device 500 via the bus 510, to exchange data and signals and coordinate various types of operations by the network device 500, such as routing, switching, and/or data storage operations, for example.

Figure 6:
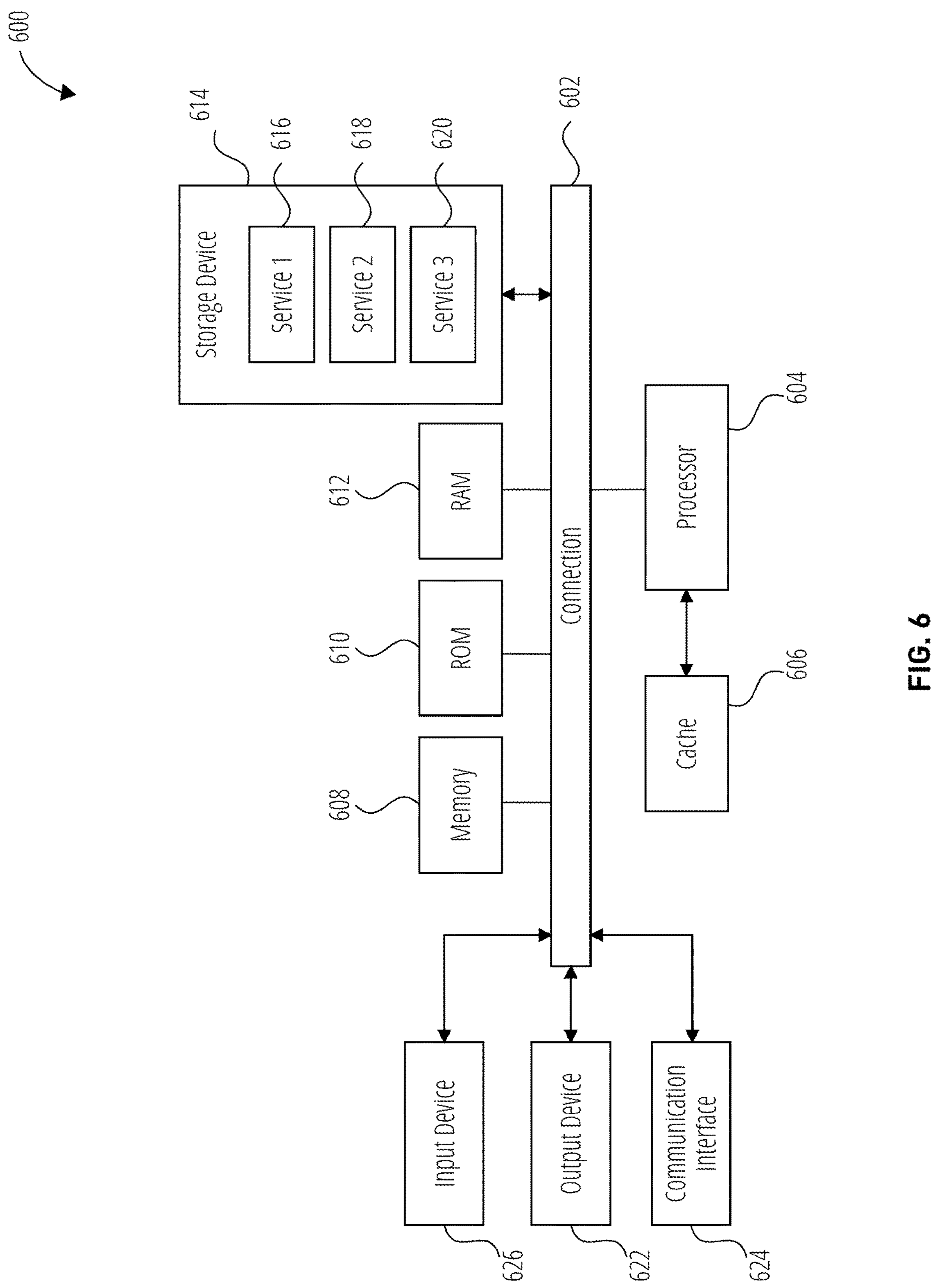
FIG. 6 shows an example of a system for implementing certain aspects of the present technology in accordance with some aspects of the present technology.

FIG. 6 shows an example of a system for implementing certain aspects of the present technology in accordance with some aspects of the present technology. FIG. 6 shows an example of computing system 600, which can be for example any computing device making up the components described in FIG. 1, 2, or 3A, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for redundant multicast groups, comprising:

receiving a request for an element of content from a device, wherein the element of content is associated with a first source address and a redundant source group identifying multiple servers in a network including the element of content, wherein the redundant source group comprises a plurality of source addresses, each source address associated with a respective server of the multiple servers providing the element of content;

determining a second source address within the redundant source group has a shorter distance to a location of the device, wherein the second source address is selected from the plurality of source addresses independent of the first source address associated with the request; and routing packets associated with the element of content from the second source address to the device.

2. The computer-implemented method of claim 1, wherein the redundant source group is a group identification (ID) that has been configured based on one or more policies at a controller associated with the network.

3. The computer-implemented method of claim 1, wherein the first source address and the second source address are a same server of the multiple servers in the network.

4. The computer-implemented method of claim 1, wherein the first source address and the second source address are different servers of the multiple servers in the network.

5. The computer-implemented method of claim 1, further comprising:

listing, on a forwarding routing table, one or more routes associated with one or more source addresses, wherein each of the one or more routes include at least a source ID associated with a source address, a group ID associated with the redundant source group, and a distance associated with the source address.

6. The computer-implemented method of claim 1, further comprising:

monitoring a connection between the device to the second source address.

7. The computer-implemented method of claim 6, further comprising:

determining the connection has failed; and routing, automatically upon determining the connection has failed, the device to a third source address of the multiple servers, wherein the third source address is selected according to a server selection policy.

8. The computer-implemented method of claim 1, wherein each of the multiple servers are associated with an individual Internet Protocol (IP) source address.

9. The computer-implemented method of claim 1, wherein the element of content is the same across the multiple servers and includes one or more of a sports game, live event, television program, or broadcast.

10. A computing apparatus comprising:

a processor; and a memory storing instructions that, when executed by the processor, configure the apparatus to:

receive a request for an element of content from a device, wherein the element of content is associated with a first source address and a redundant source group identifying multiple servers in a network including the element of content, wherein the redundant source group comprises a plurality of source addresses, each source address associated with a respective server of the multiple servers providing the element of content;

determine a second source address within the redundant source group has a shorter distance to a location of the device, wherein the second source address is selected from the plurality of source addresses independent of the first source address associated with the request; and route packets associated with the element of content from the second source address to the device.

11. The computing apparatus of claim 10, wherein the redundant source group is a group identification (ID) that has been configured based on one or more policies at a controller associated with the network.

12. The computing apparatus of claim 10, wherein the first source address and the second source address are a same server of the multiple servers in the network.

13. The computing apparatus of claim 10, wherein the first source address and the second source address are different servers of the multiple servers in the network.

14. The computing apparatus of claim 10, wherein the instructions further configure the apparatus to:

list, on a forwarding routing table, one or more routes associated with one or more source addresses, wherein each of the one or more routes include at least a source ID associated with a source address, a group ID associated with the redundant source group, and a distance associated with the source address.

15. The computing apparatus of claim 10, wherein the instructions further configure the apparatus to:

monitor a connection between the device to the second source address.

16. The computing apparatus of claim 15, wherein the instructions further configure the apparatus to:

determine the connection has failed; and route, automatically upon determining the connection has failed, the device to a third source address of the multiple servers, wherein the third source address is selected according to a server selection policy.

17. The computing apparatus of claim 10, wherein each of the multiple servers are associated with an individual Internet Protocol (IP) source address.

18. A non-transitory computer-readable storage medium, the non-transitory computer-readable storage medium including instructions that when executed by a computer, cause the computer to:

receive a request for an element of content from a device, wherein the element of content is associated with a first source address and a redundant source group identifying multiple servers in a network including the element of content, wherein the redundant source group comprises a plurality of source addresses, each source address associated with a respective server of the multiple servers providing the element of content;

determine a second source address within the redundant source group has a shorter distance to a location of the device, wherein the second source address is selected from the plurality of source addresses independent of the first source address associated with the request; and route packets associated with the element of content from the second source address to the device.

19. The non-transitory computer-readable storage medium of claim 18, wherein the instructions further configure the computer to:

monitor a connection between the device to the second source address.

20. The non-transitory computer-readable storage medium of claim 19, wherein the instructions further configure the computer to:

determine the connection has failed; and route, automatically upon determining the connection has failed, the device to a third source address of the multiple servers, wherein the third source address is selected according to a server selection policy.

* * * * *